United States Patent [19]

Arthur et al.

[11] 4,132,748

[45] Jan. 2, 1979

[54] POLYMERIC FLAME-RETARDANT THERMOPLASTIC RESINS

[75] Inventors: Ralph P. Arthur, Parkersburg; Roy M. Turner, Washington, both of W. Va.

[73] Assignee: Borg-Warner Corporation, Chicago, Ill.

[21] Appl. No.: 790,634

[22] Filed: Apr. 25, 1977

[51] Int. Cl.$^2$ .................... C08L 55/02; C08L 67/02; C09K 3/28

[52] U.S. Cl. .............................. 260/873; 260/45.75 B

[58] Field of Search .......................... 260/45.75 B, 873

[56] References Cited

U.S. PATENT DOCUMENTS

| | | | |
|---|---|---|---|
| 3,419,518 | 12/1968 | Mahling et al. | 260/45.75 B |
| 3,738,958 | 6/1973 | Paul | 260/45.75 B |
| 3,883,481 | 5/1975 | Kopetz et al. | 260/45.75 B |
| 4,024,102 | 5/1977 | Stackman et al. | 260/45.75 B |

FOREIGN PATENT DOCUMENTS 973830  8/1966  Canada.

OTHER PUBLICATIONS

Hackh's Chemical Dictionary, Fourth Edition, McGraw-Hill, N.Y., pp. 302 & 303, 1969.

I & EC Product Research & Development, vol. 8, No. 4, Dec. 1969, pp. 381-391.

*Primary Examiner*—Allan Lieberman
*Attorney, Agent, or Firm*—William S. McCurry

[57] ABSTRACT

Disclosed are flame-retardant thermoplastic resins such as graft ABS, polystyrene, polypropylene, and the like, containing polyethylene tetrabromophthalate and antimony trioxide.

1 Claim, No Drawings

POLYMERIC FLAME-RETARDANT THERMOPLASTIC RESINS

BACKGROUND OF THE INVENTION

This invention relates to thermoplastic resins made flame retardant by mixing the resin with brominated polyesters, particularly those prepared from tetrabromophthalic anhydride and low molecular weight glycols such as polyethylene glycol, polybutylene glycol and polypropylene glycol; and antimony trioxide.

The theory and practice of using heavily halogenated organic chemical compounds and antimony oxide as additives to produce flame-retarded thermoplastic compositions is a well-known commercial process. The commonly used, highly brominated aromatic organic compounds result in a number of adverse effects to the thermoplastic flame-retarded products.

These adverse effects are (1) poor efficiency; i.e., high levels of bromine and antimony oxide are required to obtain adequate flame retardancy in thin sections; (2) a drastic reduction of overall balance of physical properties, particularly heat distortion and impact strength; and (3) mold buildup of flame retardant during processing and resultant surface degradation of molded parts.

SUMMARY OF THE INVENTION

This invention relates to the use of heavily brominated polyesters as flame retardants in thermoplastic polymers such as graft ABS, polystyrene, polypropylene and the like.

EXAMPLE 1

A stirred reactor was charged with 930 grams (15 moles) of ethylene glycol. The glycol was stirred and heated to 155° C, and 2320 grams (5 moles) of tetrabromophthalic anhydride was added. The reaction mixture was stirred and heated at 165° C for eight hours to distill off water produced during the reaction to form diester. The reaction was mass cooled to 130° C; 200 grams of xylene were added and excess glycol was azeotroped from the reaction mixture at 170°–175° C; and pressure was then reduced to 20 mm Hg. at 170°–175° C to remove residual xylene and glycol. Analysis of the reaction product at this point gave:

Melting point: 35–50° C; % Br: 55.3; Acid number: 13.0

Infrared analysis: Diester, trace of glycol, no anhydride or carboxyl evident.

500 grams of the above diester (0.87 moles) was heated in a stirred reactor to 145° C and 2.0 grams of Sb$_2$O$_3$ and 0.35 grams of (TNPP) tri-nonylphenyl phosphite was added. Pressure was adjusted to 20 mm Hg. and condensation to polyester (with removal of glycol) was continued for 10 hours at 185° C. Infrared analysis showed the reaction product to be polyethylene tetrabromophthalate:

Analysis Found: Melting point: 105–115° C; % Br: 58.5; Acid number: 8.0; Molecular weight (DMF): 3,000.

EXAMPLE 2

After formation of the diester of Example 1, the reaction mixture was stirred and heated for 3.5 hours at 195–200° C at 10 mm Hg. pressure to produce a polyethylene tetrabromophthalate with the following analysis:

Melting point: 95–100° C; % Br: 57.5; Acid number: 4.6; Molecular weight (DMF): 1,260.

EXAMPLE 3

The performance of compositions of this invention were determined by incorporating the flame retardants in various thermoplastic polymers by the following procedure:

Specimens were prepared by mixing the components in a Banbury mixer 3 minutes at 320° F. The composition was sheeted off on a two-roll mill, cooled, ground and compression molded at 300° F to form ⅛ inch (125 mils) or 60 mil test specimens. Testing was by standard ASTM or Borg-Warner Chemicals test methods.

TABLE I

|  | A | B | C |
|---|---|---|---|
| ABS Polymer* | 100 | 100 | 100 |
| Antimony Trioxide | 7.5 | 7.5 | 7.5 |
| Polyester Example 1 | 25 | | |
| Polyester Example 2 | | 25.5 | |
| 1,2 Bis(Tribromophenoxy)ethane | | | 22 |
| Parts Bromine per 100 Parts of polymer | 14.6 | 14.6 | 15.4 |
| Flammability: | | | |
| Oxygen Index | 31.5 | 34 | 28.5 |
| UL-94 (60 Mils) | V-0 | V-0 | V-0 |
| Falling Dart Impact (Ft.-lbs.) | 4–6 | 2–4 | 2–4 |

*Prepared by polymerizing a mixture of 53.3 parts by weight styrene and 26.7 parts by weight acrylonitrile in the presence of 20 parts by weight polybutadiene.

EXAMPLE 4

To establish the efficiency of the brominated polyester as a flame retardant in ABS polymers, a series of compounds were prepared as in Example 3 with reduced amounts of both brominated polyester compound and antimony trioxide.

TABLE II

|  | PARTS BY WEIGHT | | | |
|---|---|---|---|---|
|  | D | E | F | G |
| ABS Polymer of Example 3 | 100 | 100 | 100 | 100 |
| Antimony Trioxide | 4.5 | 5.62 | 6.0 | 6.0 |
| Polyester Example 1 | 15 | 18.72 | 20 | — |
| 1,2 Bis(tribromophenoxy)ethane (Prior Art) | — | — | — | 19.2 |
| Parts Bromine per 100 parts polymer | 8.75 | 10.9 | 11.7 | 13.4 |
| Flammability: | | | | |
| Oxygen Index | 28.0 | 29.5 | 30.2 | 27.0 |
| UL-94 (60 Mils) | V-0 | V-0 | V-0 | NSE |
| Falling Dart Impact | | | | |

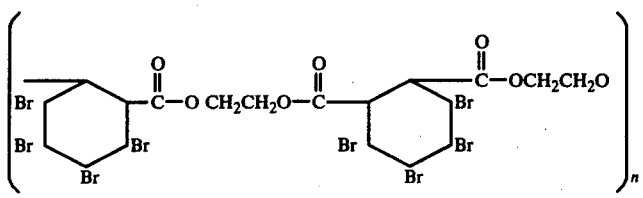

TABLE II-continued

| | PARTS BY WEIGHT | | | |
|---|---|---|---|---|
| | D | E | F | G |
| (Ft.-Lbs.) | 6–8 | 6–8 | 4–6 | 2–4 |

EXAMPLE 5

Due to the surprising efficiency of the brominated polyester flame retardant, further compositions were prepared as in Example 3 with reduced amounts of the brominated polyester.

TABLE III

| | PARTS BY WEIGHT | | | | |
|---|---|---|---|---|---|
| | H | I | J | K | L |
| ABS Polymer of Example 3 | 100 | 100 | 100 | 100 | 100 |
| Antimony Trioxide | 7.5 | 7.5 | 7.5 | 7.5 | 7.5 |
| Polyester Example 1 | 10.4 | 15.0 | 18.0 | 21.0 | 26.2 |
| Parts Bromine per 100 parts polymer | 6.0 | 8.59 | 10.3 | 12.0 | 15.1 |
| Flammability: | | | | | |
| Oxygen Index | 26.5 | 29.5 | 29.5 | 30.5 | 34.0 |
| UL-94 (60 Mils) | V-1 | V-0 | V-0 | V-0 | V-0 |

EXAMPLE 6

In order to show the efficiency of the brominated polyester/antimony oxide system in other thermoplastic polymers, a series of compositions were prepared in a Banbury mixer, sheeted, ground and compression molded in the same manner as described in Example 2. The results are as follows:

TABLE IV

| | PARTS BY WEIGHT | | | | | | | |
|---|---|---|---|---|---|---|---|---|
| | M | N | O | P | Q | R | S | T |
| Polymer | | | | | | | | |
| Polystyrene (Cosden 550) | 100 | 100 | | | | | | |
| Polypropylene (Profax 6501) | | | 100 | 100 | | | | |
| Polyphenyleneoxide/Polystyrene (Noryl SE-1) | | | | | 100 | 100 | | |
| Polycarbonate (Rucon M-50) | | | | | | | 100 | 100 |
| Antimony Oxide | 7.5 | 7.5 | 7.5 | 7.5 | 5.0 | 5.0 | 5.0 | 5.0 |
| Polyester Example 2 | — | 26.7 | — | 26.7 | — | 14.0 | — | 14.0 |
| Flammability: | | | | | | | | |
| Oxygen Index | 17.4 | 25.0 | 17.4 | 24.0 | 30.5 | 32.5 | 30.5 | 40.5 |
| UL-94 (60 Mils) | NSE (Burns) | V-0 | NSE (Burns) | V-2 (Drips) | NSE (Burns) | V-0 | NSE (Burns) | V-0 |
| Maximum Burn Time (Sec.) (UL-94 60 Mils) | — | 3.0 | — | 11.0 | — | 3.0 | — | 1.0 |

We claim:
1. A flame-retardant composition comprising (1) 100 parts by weight of a graft ABS resin; (2) from about 10.4 to about 26.7 parts by weight of polyethylene tetrabromophthalate; and (3) from about 4.5 to about 7.5 parts by weight of antimony trioxide.

* * * * *